UNITED STATES PATENT OFFICE.

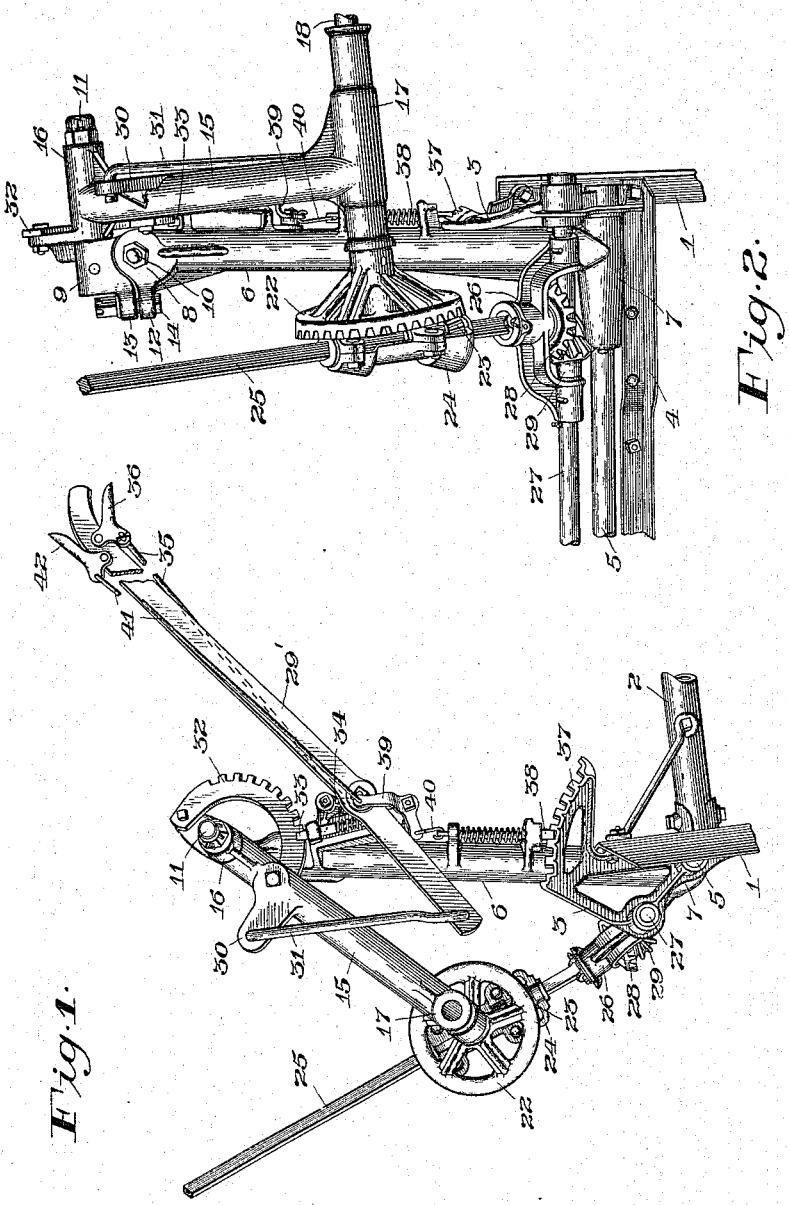

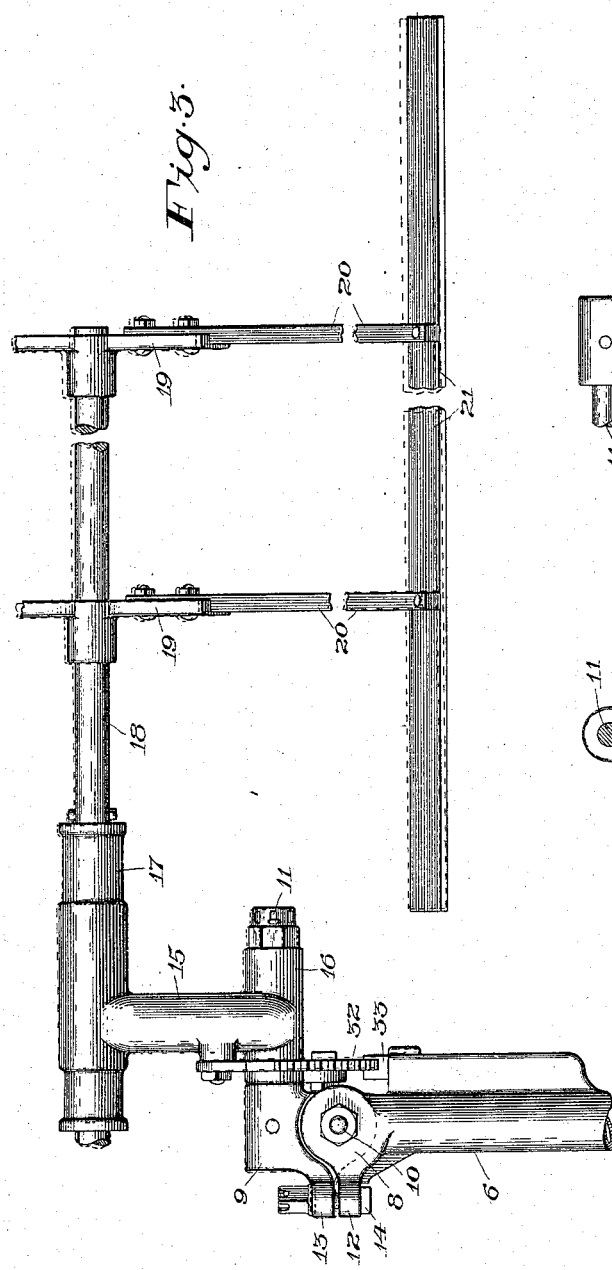

JAMES A. SHARP, OF SPRINGFIELD, OHIO, ASSIGNOR TO INTERNATIONAL HARVESTER COMPANY OF NEW JERSEY, A CORPORATION OF NEW JERSEY.

HARVESTER-REEL.

1,152,768.  Specification of Letters Patent.  Patented Sept. 7, 1915.

Application filed June 20, 1912. Serial No. 704,714.

*To all whom it may concern:*

Be it known that I, JAMES A. SHARP, a citizen of the United States, residing at Springfield, in the county of Clark and State of Ohio, have invented certain new and useful Improvements in Harvester-Reels, of which the following is a specification.

My invention relates to harvester reels, and in particular to the manner of supporting the stubbleward end of the reel whereby it may be adjusted to a higher or lower plane and in a fore and aft direction relative to the line of draft of the harvester, and consists in an improved form of jointed arm support therefor and in improved devices for controlling the movements of the arms; the object of my invention being to provide a construction comprising few parts, easily manipulated and efficient in operation. These objects are attained by means of mechanism, one embodiment of which is illustrated in the accompanying drawings, in which—

Figure 1 represents a perspective side elevation of the reel controlling mechanism; Fig. 2 is a front elevation of Fig. 1; Fig. 3 represents a front view of part of the upper portion of Fig. 2, and designed to illustrate the means whereby the reel may be adjusted relative to the grain platform of the harvester; Fig. 4 is a rear view of part of the upper portion of Fig. 3; and Fig. 5 is a side elevation of part of Fig. 4.

The same reference characters designate like parts throughout the several views.

1 represents a vertical member of the frame of a harvester, 2 the seat supporting pipe, 3 a bracket member secured to the pipe and the upper end of frame member 1, 4 a horizontal member of the frame of a harvester, having the grainward end thereof secured to the bracket member 3, 5 a shaft having the grainward end thereof received by a bearing integral with the bracket member 3, and 6 a vertically arranged reel supporting arm provided with a laterally arranged sleeve portion 7 at the lower end thereof whereby said arm is pivotally mounted upon said shaft in a manner permitting the upper end thereof to swing in a fore and aft direction relative to the line of draft of the machine. The arm 6 is provided with an ear member 8 at the upper end thereof, to which is pivotally connected a block member 9 by means of a pivot bolt 10, having the axis thereof arranged in a fore and aft direction, and 11 represents a stud member carried by said block and extending grainward therefrom.

12 represents an ear member integral with the upper part of arm 6, and extending stubbleward therefrom, 13 a complemental ear member integral with the block 9, and 14 a vertically arranged bolt received by openings in the ear members 12 and 13 and operative to adjust the block 9 angularly about the axis thereof.

15 represents a longitudinally arranged reel supporting arm provided with a sleeve portion 16 at the rear end thereof that receives the stud 11 in a manner permitting the arm to swing about the axis thereof, the opposite end of the arm being provided with a sleeve portion 17 at the front end thereof, in which is journaled the reel shaft 18, having spiders 19 secured thereto, to which are connected reel arms 20, having reel blades 21 secured to the outside ends thereof.

22 represents a gear member secured to the stubbleward end of the reel shaft and engaging with a pinion 23 carried by a bracket member 24 rotatable on the shaft 18 and slidably mounted upon a vertically arranged reel driving shaft 25, the lower end of the shaft 25 being pivotally connected to a yoke member 26 that is journaled upon a horizontally arranged reel driving shaft 27, having a bearing in the bracket member 3.

28 represents a pinion secured to the lower end of shaft 25 and engaging with a pinion 29 secured to shaft 27.

29[1] represents a hand lever pivotally mounted intermediate the ends thereof upon reel arm 6.

30 represents a vertically arranged ear member integral with the reel supporting arm 15, and 31 a link connection between said ear member and the front end of the hand lever 29[1], whereby the arm 15 may be adjusted angularly about the axis thereof, for the purpose of adjusting the reel to a higher or lower plane.

32 represents a toothed sector secured to arm 15 and arranged concentric with the axis thereof, and 33 a spring-pressed sliding detent carried by the reel arm 6 and adapted to engage with the toothed sector 32 in a manner to secure the arm 15 at any position in the range of adjustment thereof, the detent being controlled by means of a bell crank lever 34 pivotally mounted upon the reel supporting arm 6, and having one arm thereof engaging with the detent 33 and the remaining arm connected, by means of a rod 35, with a thumb lever 36 pivotally mounted upon the rear end of the hand lever $29^1$.

37 represents a toothed sector integral with the bracket member 3 and arranged concentric with the axis of the reel supporting arm 6, and 38 a spring-pressed sliding detent carried by the arm 6 and having one end thereof adapted to engage with the toothed sector 37.

39 represents a bell crank lever pivotally mounted upon the reel supporting arm 6, having one arm thereof connected, by means of a link 40, with the opposite end of the detent 38, and the remaining arm connected, by means of a rod 41, with a supplemental thumb lever 42 pivotally mounted upon the rear end of the hand lever $29^1$.

By disengaging the sliding detent 33 and manipulating the hand lever, the operator may raise or lower the reel to any position of adjustment within the range of movement thereof, and by disengaging the detent 38 the reel supporting arm 6 may be swung in a fore and aft direction.

Further, it is to be noted that the operator is also enabled to adjust the reel supporting arm 15 with respect to the arm 6, or with respect to the cutter bar on the harvester, by adjusting the block 9 through the adjustment 10 therefor, this block being held in any of its positions of adjustment by means of the connection 14. Thus it is seen that the operator is enabled to adjust both reel arms in planes parallel to the line of draft, and is also able to adjust the reel arm 15 and the reel in a plane at right angles to the line of draft.

Attention is also directed to the fact that in this device, through the applicant's improved sector and detent mechanism, wherein the sectors are oppositely disposed and the detents are carried upon an upstanding reel arm at points between the same, a very compact construction is produced and also one which is of a very simple, rugged and satisfactory nature from a manufacturing standpoint. These and other advantages of my improved construction will, however, be clearly apparent to one skilled in the art and need not be herein more specifically set forth.

While I have in this application described but one embodiment of my invention, it is, of course to be understood that the form shown has been chosen for purposes of illustration and that the invention itself may be embodied in other forms than that shown without departing from its spirit.

What I claim as being my invention, and desire to secure by Letters Patent, is:

1. In a harvester, a frame, a reel supporting arm carried thereon and angularly adjustable with respect thereto, a member carried on said arm and angularly adjustable with respect thereto, and a second reel supporting arm carried by said member and angularly adjustable with respect thereto.

2. In a harvester, a frame, a reel supporting arm carried thereon and adjustable in a plane parallel to the line of draft, a member carried on said arm and adjustable in a plane substantially at right angles to the line of draft, and a second reel supporting arm carried on said member and adjustable in a plane parallel to the line of draft.

3. In a harvester, a frame, a reel supporting arm pivoted thereon and angularly adjustable with respect thereto, a member carried on said arm and angularly adjustable with respect thereto, a second reel supporting arm carried by said member and angularly adjustable with respect thereto, and independent means for positioning each of said elements in each position of adjustment thereof.

4. In a harvester, a frame, a reel supporting arm pivoted thereon and angularly adjustable with respect thereto, a member carried on said arm and angularly adjustable with respect thereto, a second reel supporting arm carried by said member and angularly adjustable with respect thereto, independent means for positioning each of said elements in each position of adjustment thereof, and means operable from a distant point for controlling a plurality of said positioning means.

5. In a harvester, a frame, a reel supporting arm pivoted thereon and angularly adjustable with respect thereto, a member carried on said arm and angularly adjustable with respect thereto, a second reel supporting arm carried by said member and angularly adjustable with respect thereto, independent means for positioning each of said elements in each position of adjustment thereof, a lever operatively connected to said arms and movable to swing the same about their pivots, and means operable from the free end of said lever for controlling a plurality of said positioning means.

6. In a harvester, a frame, a reel supporting arm carried thereon, a block pivotally mounted on said reel supporting arm and adjustable in a plane substantially at right angles thereto, a laterally extending stud carried by said block and disposed substantially at right angles to said arm, and a second reel supporting arm rotatably mounted on said stud and disposed substantially at right angles thereto.

7. In a harvester, a frame, a reel supporting arm carried thereon, a block pivotally mounted on the upper end thereof, a stud carried by said block and disposed substantially at right angles to said arm, a second reel supporting arm having sleeves on its opposite ends, one of the sleeves on said arm being rotatably mounted on said stud, and a reel shaft disposed substantially at right angles to said arm and journaled in the other sleeve thereon.

8. In a harvester, a frame, a reel supporting arm carried thereon, a block pivotally mounted on the upper end of said arm on a pivot disposed transversely thereof, a stud carried by said block and disposed substantially at right angles to said pivot, a second reel supporting arm having a sleeve journaled on said stud, said reel supporting arm extending at right angles to said sleeve and having a second sleeve on its opposite end, and a reel shaft journaled in said last mentioned sleeve.

9. In a harvester, a frame, a reel supporting arm carried thereon, a block pivotally mounted on the upper end of said arm on a pivot disposed transversely thereof, a stud carried by said block and disposed substantially at right angles to said arm, a reel supporting arm having sleeves on its opposite ends and one sleeve journaled on said stud, a reel shaft journaled in the other sleeve on said arm, and means for positioning said block and said last mentioned arm in any position of adjustment with respect to said first mentioned arm.

10. In a harvester, a frame, a reel supporting arm pivotally mounted thereon, a block pivotally mounted on the upper end of said arm on a pivot disposed transversely of the latter, a stud fixed to said block and protruding therefrom substantially at right angles to said arm, a second reel arm rotatably mounted on said stud and disposed in parallel relation to said first mentioned arm, a sector fixed to said last mentioned reel arm normally underlying said stud, and means carried on said first mentioned reel supporting arm and slidable longitudinally thereof engageable with said sector.

11. In a harvester, a frame, a reel supporting arm pivoted thereon, a second reel supporting arm pivoted to said first mentioned arm, oppositely disposed sectors carried on said frame and second arm respectively, lever mechanism for adjusting the positions of said arms relatively to the frame and to each other pivotally connected to said last mentioned arm and pivoted to said first mentioned arm at a point intermediate said sectors, and oppositely disposed detent mechanism slidably mounted on said first mentioned arm and engageable with said sectors operable from the free end of said lever.

12. In a harvester, a frame, a reel supporting arm pivoted thereon, a lever pivoted to said arm at a point intermediate its ends, a second reel supporting arm pivoted to said first arm at a point above said lever, a sector carried on said frame, a sector carried on said second arm, oppositely movable detents slidably mounted on said first mentioned arm engageable with said sectors, bell cranks pivotally mounted on said first mentioned reel supporting arm and operatively connected to said detents, and means operable from the free end of said lever for rotating said bell cranks about their pivots and thereby operating said detents.

13. In a harvester, a frame, a reel supporting arm pivoted thereon and angularly adjustable with respect thereto, an upstanding sector fixed to said frame and disposed in a plane parallel to the plane of movement of said arm, a lever pivoted at a point intermediate its ends to a point on said arm intermediate the ends of the latter, a second reel supporting arm pivoted to said first mentioned reel supporting arm at a point above the pivot of said lever, operative connections between one end of said lever and said second reel supporting arm for swinging the latter about its pivot as the lever is operated, a downwardly disposed sector fixed to said second reel supporting arm, detents slidable longitudinally of said first mentioned reel arm and engageable with said sectors, operating mechanism for said detents mounted on said reel supporting arm, and means for actuating said detent operating mechanism carried on said lever and operable from the free end thereof.

JAMES A. SHARP.

Witnesses:
R. P. Brassel,
R. M. Hollenbeck.

Copies of this patent may be obtained for five cents each, by addressing the "Commissioner of Patents, Washington, D. C."